(12) United States Patent
Kayano et al.

(10) Patent No.: US 9,893,598 B2
(45) Date of Patent: Feb. 13, 2018

(54) MAGNET TEMPERATURE ESTIMATION DEVICE FOR PERMANENT MAGNET MOTOR AND MAGNET TEMPERATURE ESTIMATION METHOD FOR PERMANENT MAGNET MOTOR

(71) Applicant: Mitsubishi Electric Corporation, Tokyo (JP)

(72) Inventors: Shinsuke Kayano, Tokyo (JP); Masaya Inoue, Tokyo (JP); Shinji Nishimura, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 357 days.

(21) Appl. No.: 14/773,951

(22) PCT Filed: Apr. 26, 2013

(86) PCT No.: PCT/JP2013/062475
§ 371 (c)(1),
(2) Date: Sep. 9, 2015

(87) PCT Pub. No.: WO2014/174682
PCT Pub. Date: Oct. 30, 2014

(65) Prior Publication Data
US 2016/0043615 A1 Feb. 11, 2016

(51) Int. Cl.
*H02K 1/27* (2006.01)
*H02K 11/00* (2016.01)
(Continued)

(52) U.S. Cl.
CPC ........... *H02K 11/0094* (2013.01); *H02K 1/27* (2013.01); *H02K 11/25* (2016.01); *H02P 29/662* (2016.11)

(58) Field of Classification Search
CPC ................ H02K 11/0094; H02K 1/27
See application file for complete search history.

(56) References Cited

U.S. PATENT DOCUMENTS 5,920,161 A * 7/1999 Obara ............... B60L 3/0023
180/65.225
6,674,262 B2 * 1/2004 Kitajima ................ H02P 6/10
318/722
(Continued)

FOREIGN PATENT DOCUMENTS

CN 102694438 A 9/2012
JP 2003-235286 A 8/2003
(Continued)

OTHER PUBLICATIONS

Communication dated Dec. 16, 2016, from the State Intellectual Property Office of the P.R.C. in counterpart Chinese application No. 201380076006.0.
(Continued)

*Primary Examiner* — Robert W Horn
(74) *Attorney, Agent, or Firm* — Sughrue Mion, PLLC; Richard C. Turner (57) ABSTRACT

A magnet temperature estimation device includes: a voltage detector (1) for detecting a voltage at a time when a winding is energized; a high-order component detector (2) for detecting a high-order component of the voltage; a reference database (3) for storing in advance, as a table, a correspondence relationship between the high-order component and two or more parameters, which include a magnet temperature and another one or more parameters, as parameters affecting the voltage from which the high-order component is detected; a parameter value detector (4) for detecting a value of the another one or more parameters; and a magnet temperature estimator (5) for estimating a magnet temperature corresponding to the high-order component detected by
(Continued)

the high-order component detector based on the another one or more parameters detected by the parameter value detector and the table stored in the reference database.

8 Claims, 6 Drawing Sheets

(51) Int. Cl.
*H02P 29/66* (2016.01)
*H02K 11/25* (2016.01)

(56) References Cited

U.S. PATENT DOCUMENTS

| | | | | |
|---|---|---|---|---|
| 7,839,108 | B2* | 11/2010 | Patel | H02H 7/0852 |
| | | | | 318/400.01 |
| 7,979,171 | B2* | 7/2011 | Wu | B60L 15/025 |
| | | | | 701/22 |
| 8,547,045 | B2* | 10/2013 | Wu | H02P 7/285 |
| | | | | 318/400.02 |
| 9,054,617 | B2* | 6/2015 | Kawai | H02P 29/662 |
| 9,091,600 | B2* | 7/2015 | Senoo | G01K 7/42 |
| 9,160,272 | B2* | 10/2015 | Tachibana | H02P 6/08 |
| 9,372,235 | B2* | 6/2016 | Weber | G01R 31/343 |
| 9,438,145 | B2* | 9/2016 | Reigosa | H02P 23/14 |
| 9,623,753 | B2* | 4/2017 | Mori | B60L 3/12 |
| 9,628,017 | B2* | 4/2017 | Ogawa | B60L 3/12 |
| 9,647,591 | B2* | 5/2017 | West | H02P 21/141 |
| 2015/0155802 | A1* | 6/2015 | Miyata | H02P 6/001 |
| | | | | 318/400.08 |
| 2015/0367734 | A1* | 12/2015 | Mori | B60L 3/12 |
| | | | | 701/22 |
| 2016/0043615 | A1* | 2/2016 | Kayano | H02K 1/27 |
| | | | | 310/68 B |
| 2016/0352275 | A1* | 12/2016 | Senoo | H02P 29/662 |
| 2017/0115168 | A1* | 4/2017 | Kim | G01K 11/00 |

FOREIGN PATENT DOCUMENTS

| | | |
|---|---|---|
| JP | 2008-206323 A | 9/2008 |
| JP | 2010-130853 A | 6/2010 |
| JP | 2010-200515 A | 9/2010 |
| JP | 2012-035946 A | 2/2012 |
| JP | 2012-055119 A | 3/2012 |
| JP | 2012-205341 A | 10/2012 |
| JP | 2013-005503 A | 1/2013 |

OTHER PUBLICATIONS

International Search Report for PCT/JP2013/062475 dated Jul. 23, 2013.

* cited by examiner

Fig. 1

| ROTATION SPEED (n KINDS) | $\omega_1$、$\omega_2$、$\omega_3$、···$\omega_n$ |

| MAGNET TEMPERATURE (m KINDS) | $T_1$、$T_2$、$T_3$、···$T_m$ |

VOLTAGE TABLE (n×m KINDS)

MAGNET TEMPERATURE ESTIMATION DEVICE FOR PERMANENT MAGNET MOTOR AND MAGNET TEMPERATURE ESTIMATION METHOD FOR PERMANENT MAGNET MOTOR

CROSS REFERENCE TO RELATED APPLICATIONS

This application is a National Stage of International Application No. PCT/JP2013/062475 filed Apr. 26, 2013, the contents of all of which are incorporated herein by reference in their entirety.

TECHNICAL FIELD

The present invention relates to a magnet temperature estimation device and a magnet temperature estimation method capable of estimating a magnet temperature of a permanent magnet motor with high accuracy.

BACKGROUND ART

In recent years, a motor for use in electric vehicles/hybrid electric vehicles (EV/HEV) uses a magnet having a reduced content of dysprosium (Dy) in order to reduce the cost of the magnet. The reduced content of Dy, however, may cause demagnetization at high temperature.

It is therefore important to grasp a magnet temperature, and it is necessary to estimate the magnet temperature and operate the motor so that the motor is prevented from being applied with an excessive demagnetizing field at high temperature. One example of such technology is to estimate the magnet temperature by detecting an induced voltage constant (see, for example, Patent Literature 1).

CITATION LIST

Patent Literature

[PTL 1] JP 2012-55119 A

SUMMARY OF INVENTION

Technical Problem

The related art, however, has the following problem.

In Patent Literature 1, the magnet temperature is estimated from the induced voltage constant (that is, a value corresponding to a fundamental component of voltage). The fundamental component, however, changes little with respect to a change in magnet temperature. Therefore, in estimating the magnet temperature, high measurement accuracy is required.

The present invention has been made in order to solve the problem described above, and it is an object thereof to provide a magnet temperature estimation device for a permanent magnet motor and a magnet temperature estimation method for a permanent magnet motor, which are capable of estimating a magnet temperature with high accuracy based not on a fundamental component.

Solution to Problem

According to one embodiment of the present invention, there is provided a magnet temperature estimation device for a permanent magnet motor, the permanent magnet motor including an annular stator having a winding wound therearound and a rotator core including a permanent magnet, the magnet temperature estimation device including: a voltage detector for detecting a voltage at a time when the winding is energized; a high-order component detector for detecting a high-order component of the voltage detected by the voltage detector; a reference database for storing in advance, as a table, a correspondence relationship between the high-order component and two or more parameters, which include a magnet temperature and another one or more parameters, as parameters affecting the voltage from which the high-order component is detected; a parameter value detector for detecting a value of the another one or more parameters; and a magnet temperature estimator for estimating a magnet temperature corresponding to the high-order component detected by the high-order component detector based on the another one or more parameters detected by the parameter value detector and the table stored in the reference database.

Further, according to one embodiment of the present invention, there is provided a magnet temperature estimation method for a permanent magnet motor, the permanent magnet motor including an annular stator having a winding wound therearound and a rotator core including a permanent magnet, the magnet temperature estimation method including: a voltage detection step of detecting a voltage at a time when the winding is energized; a high-order component detection step of detecting a high-order component of the voltage detected in the voltage detection step; a storing step of storing in a storage unit in advance, as a table, a correspondence relationship between the high-order component and two or more parameters, which include a magnet temperature and another one or more parameters, as parameters affecting the voltage from which the high-order component is detected; a parameter value detection step of detecting a value of the another one or more parameters; and a magnet temperature estimation step of estimating a magnet temperature corresponding to the high-order component detected in the high-order component detection step based on the another one or more parameters detected in the parameter value detection step and the table stored in the storage unit in the storing step.

Advantageous Effects of Invention

According to the one embodiment of the present invention, there may be obtained the magnet temperature estimation device for a permanent magnet motor and the magnet temperature estimation method for a permanent magnet motor, which are capable of estimating the magnet temperature with high accuracy based not on the fundamental component by using detection results of the high-order voltage component that has a large change rate with respect to the magnet temperature to estimate the magnet temperature.

DESCRIPTION OF EMBODIMENTS

A magnet temperature estimation device for a permanent magnet motor and a magnet temperature estimation method for a permanent magnet motor according to exemplary embodiments of the present invention are now described with reference to the drawings.

First Embodiment

Figure 1:
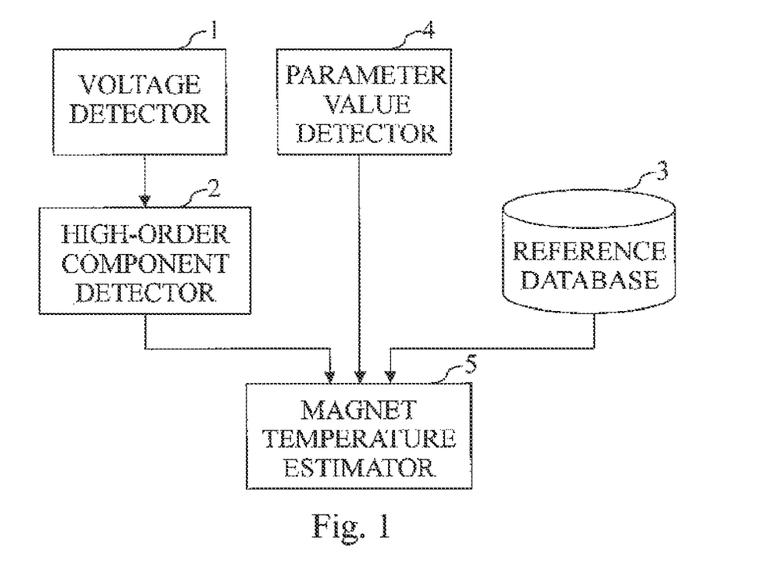
FIG. 1 is a block diagram of a magnet temperature estimation device according to a first embodiment of the present invention.

FIG. 1 is a block diagram of a magnet temperature estimation device according to a first embodiment of the present invention. The magnet temperature estimation device according to the first embodiment illustrated in FIG. 1 includes a voltage detector 1, a high-order component detector 2, a reference database 3, a parameter value detector 4, and a magnet temperature estimator 5.

The voltage detector 1 detects a line voltage or an interphase voltage of a rotating electrical machine (permanent magnet motor). As a detection method therefor, for example, a method of detecting the line voltage or the interphase voltage based on a voltage command value in a control system or a method of using an actually measured numerical value is applicable.

The voltage detected by the voltage detector 1 is sent to the high-order component detector 2. Then, the high-order component detector 2 calculates a high-order component of the voltage detected by the voltage detector 1. As a calculation method therefor, for example, a method of determining the high-order component through Fourier transform or a method of extracting a particular frequency component by a band pass filter is applicable.

Further, the reference database 3 is a storage unit that stores in advance a plurality of tables, each of which defines a correspondence relationship between parameters affecting the voltage to be detected by the voltage detector 1, such as a magnet temperature, a rotation speed, a coil temperature, a current, and a current phase, and a high-order component of the voltage.

Figure 2:
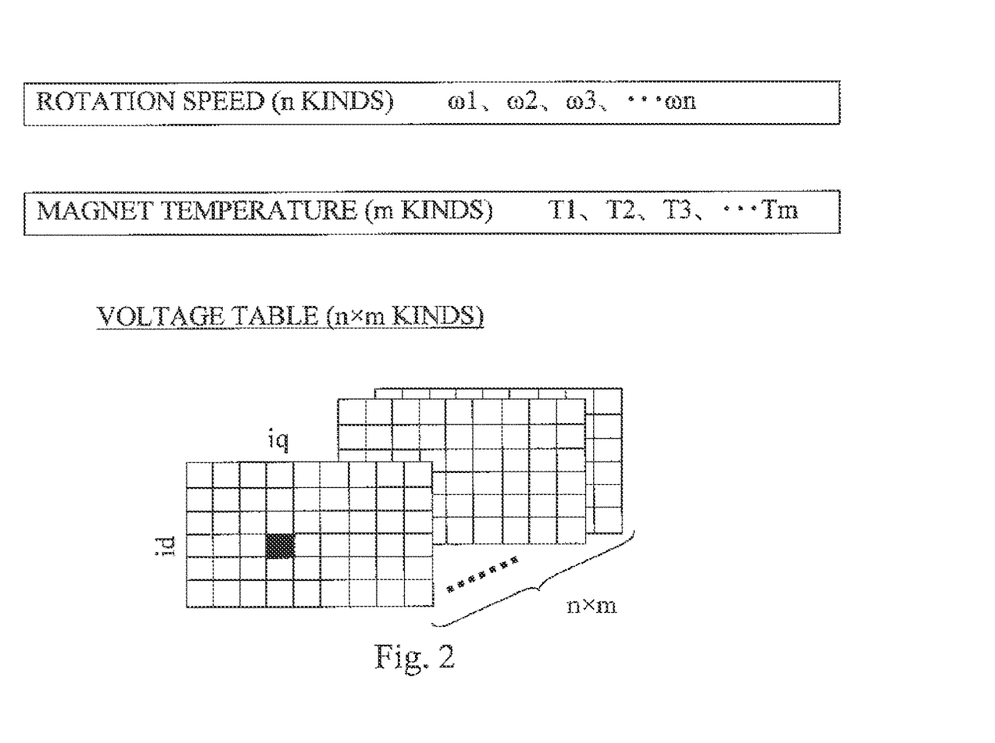
FIG. 2 is a diagram for showing a specific example of a plurality of tables stored in advance in a reference database according to the first embodiment of the present invention.

FIG. 2 is a diagram for showing a specific example of the plurality of tables stored in advance in the reference database 3 according to the first embodiment of the present invention. In FIG. 2, as a specific example, n×m tables formed of combinations of n kinds of rotation speeds ω1 to ωn and m kinds of magnet temperatures T1 to Tm are shown. Then, in each table, measurement results of the high-order voltage component with two parameters of a d-axis current id and a q-axis current iq are defined in advance as a two-dimensional table.

Thus, one high-order voltage component corresponding to four parameters of the rotation speed, the magnet temperature, the d-axis current id, and the q-axis current iq is specified based on the plurality of tables stored in advance in the reference database 3.

Further, the parameter value detector 4 is means for detecting parameters used for estimation of the magnet temperature. Specifically, the parameter value detector 4 can detect three parameters of the rotation speed, the d-axis current id, and the q-axis current iq in the following ways. The parameter value detector 4 detects the rotation speed with use of a rotational position sensor, such as a resolver. Further, the parameter value detector 4 acquires the d-axis current id and the q-axis current iq as current command values or actually measured values.

Then, the magnet temperature estimator 5 determines an estimated value of the magnet temperature based on the high-order voltage component detected by the high-order component detector 2, the three parameters of the rotation speed, the d-axis current id, and the q-axis current iq detected by the parameter value detector 4, and the plurality of tables stored in the reference database 3.

Specifically, the magnet temperature estimator 5 can estimate the magnet temperature by the following procedures as an example.

(Procedure 1) The magnet temperature estimator 5 extracts, for the n×m tables stored in the reference database 3, high-order voltage components (n×m) corresponding to the d-axis current id and the q-axis current iq detected by the parameter value detector 4.

(Procedure 2) The magnet temperature estimator 5 narrows down the n×m high-order voltage components extracted by Procedure 1 into m high-order voltage components extracted from m tables corresponding to the rotation speed detected by the parameter value detector 4.

(Procedure 3) The magnet temperature estimator 5 specifies a table having a value closest to the high-order voltage component calculated by the high-order component detector 2 from among the m high-order voltage components narrowed down by Procedure 2, and sets the magnet temperature corresponding to the table as the estimated value of the magnet temperature.

Note that, the above-mentioned procedures are merely an example, and the estimated value of the magnet temperature can be acquired by changing the order of Procedures 1 to 3.

One advantage of using a high-order voltage component is that the magnet temperature can be measured with higher accuracy because the high-order voltage component has a larger change rate of voltage with respect to the magnet temperature as compared to the case where a fundamental voltage component is used. Then, such an advantage was demonstrated with use of electromagnetic field analysis, and details are described below.

Figure 3:
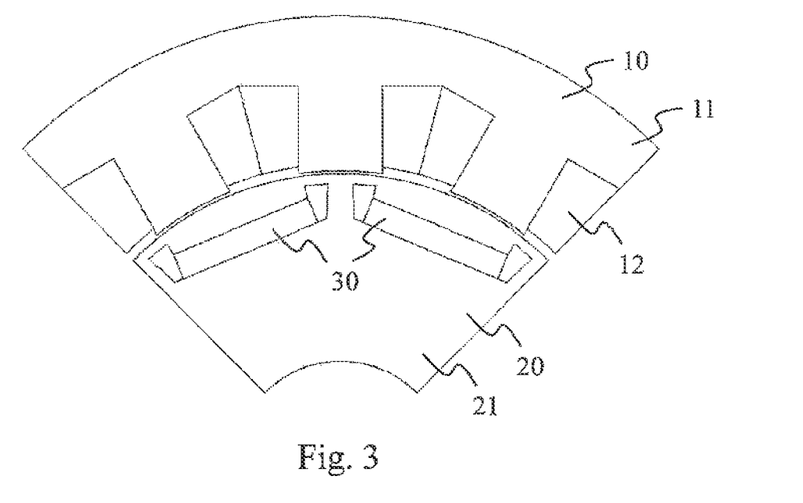
FIG. 3 is a schematic diagram of a rotating electrical machine used for electromagnetic field analysis according to the first embodiment of the present invention.

FIG. 3 is a schematic diagram of a rotating electrical machine used for electromagnetic field analysis according to the first embodiment of the present invention. The rotating electrical machine illustrated in FIG. 3 includes a stator 10 and a rotator 20. In the first embodiment, an 8-pole 12-slot configuration is described as an example, but the combination of the number of poles and the number of slots as well as the shape of the rotating electrical machine is not limited thereto.

The stator 10 includes an annular stator core 11 and a coil 12 wound around the stator core 11. On the other hand, the rotator 20 includes a rotator core 21 in which permanent magnets 30 are buried.

Main specifications of the rotating electrical machine of FIG. 3 are as follows.

Outer diameter of stator 10 φ138
Outer diameter of rotator 20 φ90
Axial length: 50 mm
Residual magnetic flux density of permanent magnet 30:
1.2 T (normal temperature)
1.1 T (100° C.)
1.0 T (180° C.)

Next, analysis conditions in the electromagnetic field analysis are shown.

Magnet temperature: three patterns of normal temperature, 100° C., and 180° C.
Input current: 3,000 AT The analysis results are described with reference to FIG. 4A to FIG. 4E.

FIG. 4A to FIG. 4E are graphs for showing change rates of respective components (fundamental, fifth-order, seventh-order, eleventh-order, and thirteenth-order) of the line voltage with respect to the magnet temperature in the electromagnetic field analysis according to the first embodiment of present invention. More specifically, the change rates of the fundamental component, the fifth-order component, the seventh-order component, the eleventh-order component, and the thirteenth-order component of the line voltage at the time when 3,000 AT is supplied are shown in FIG. 4A, FIG. 4B, FIG. 4C, FIG. 4D, and FIG. 4E, respectively.

Then, in FIG. 4A to FIG. 4E, the horizontal axis represents the magnet temperature and the vertical axis represents the ratio of the line voltage. In this case, the ratio of the line voltage represented on the vertical axis is defined by converting the value of the line voltage with the magnet temperature of 100° C. or 180° C. into a change rate with reference to a line voltage at normal temperature of the magnet. Further, in FIG. 4A to FIG. 4E, the results of analyzing the change rates for five kinds of current phases β changed to 0, 20, 40, 60, and 80 degrees are shown.

From the analysis results shown in FIG. 4A to FIG. 4E, the following is understood.

Figure 4A:
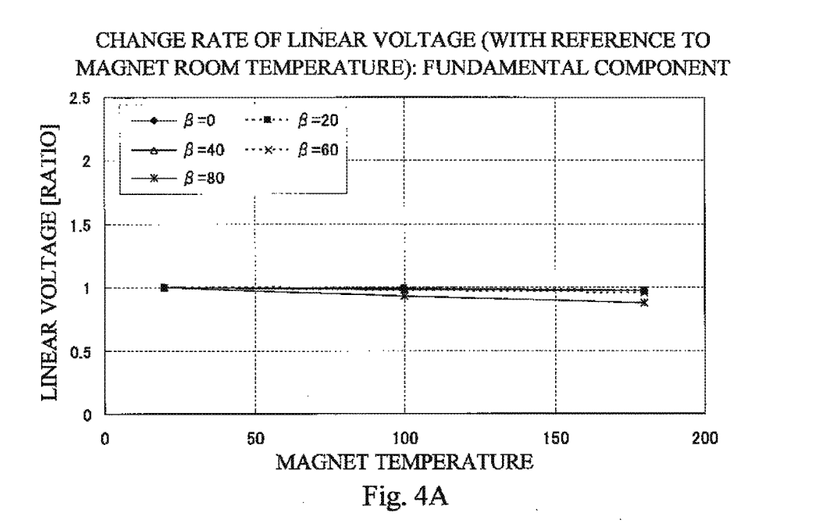
FIG. 4A is a graph for showing a change rate of a fundamental component of a line voltage with respect to a magnet temperature in the electromagnetic field analysis according to the first embodiment of the present invention.
Figure 4B:
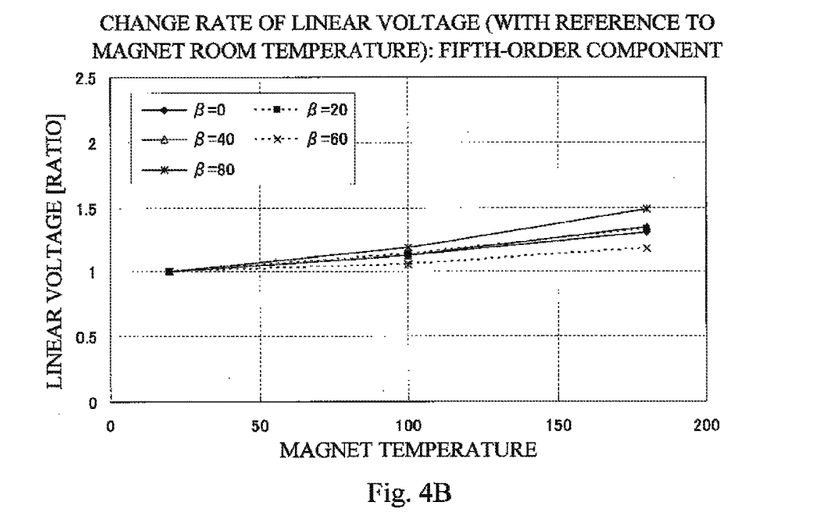
FIG. 4B is a graph for showing a change rate of a fifth-order component of the line voltage with respect to the magnet temperature in the electromagnetic field analysis according to the first embodiment of the present invention.
Figure 4C:
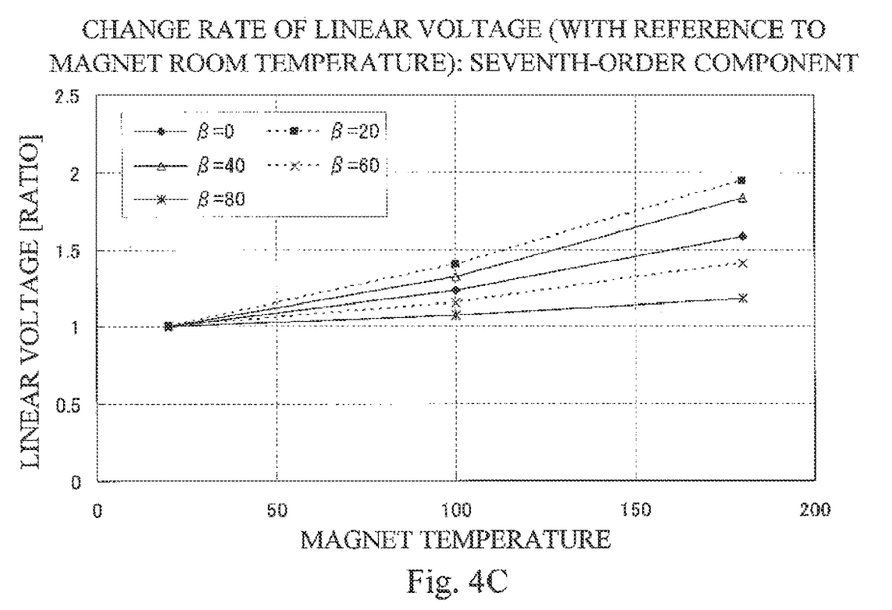
FIG. 4C is a graph for showing a change rate of a seventh-order component of the line voltage with respect to the magnet temperature in the electromagnetic field analysis according to the first embodiment of the present invention.
Figure 4D:
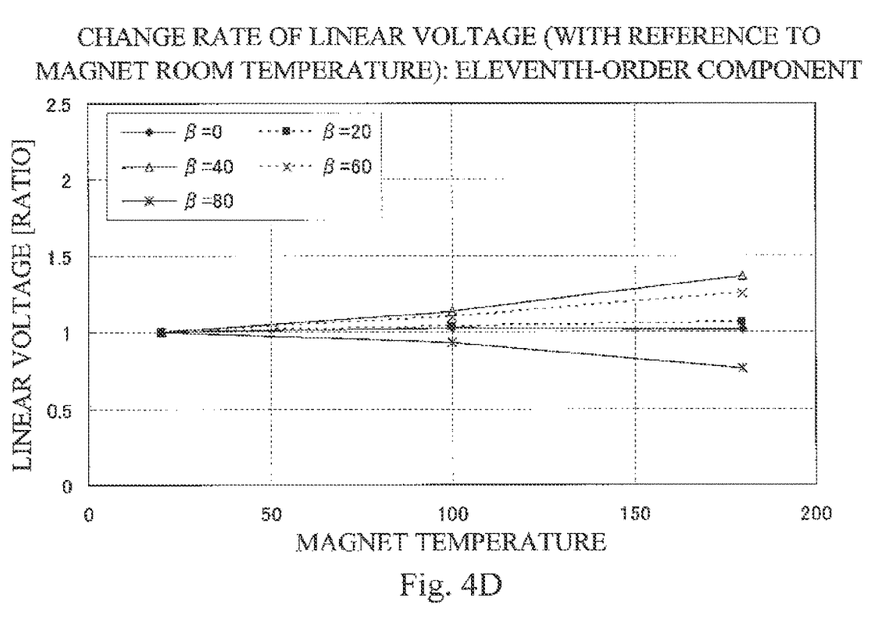
FIG. 4D is a graph for showing a change rate of an eleventh-order component of the line voltage with respect to the magnet temperature in the electromagnetic field analysis according to the first embodiment of the present invention.
Figure 4E:
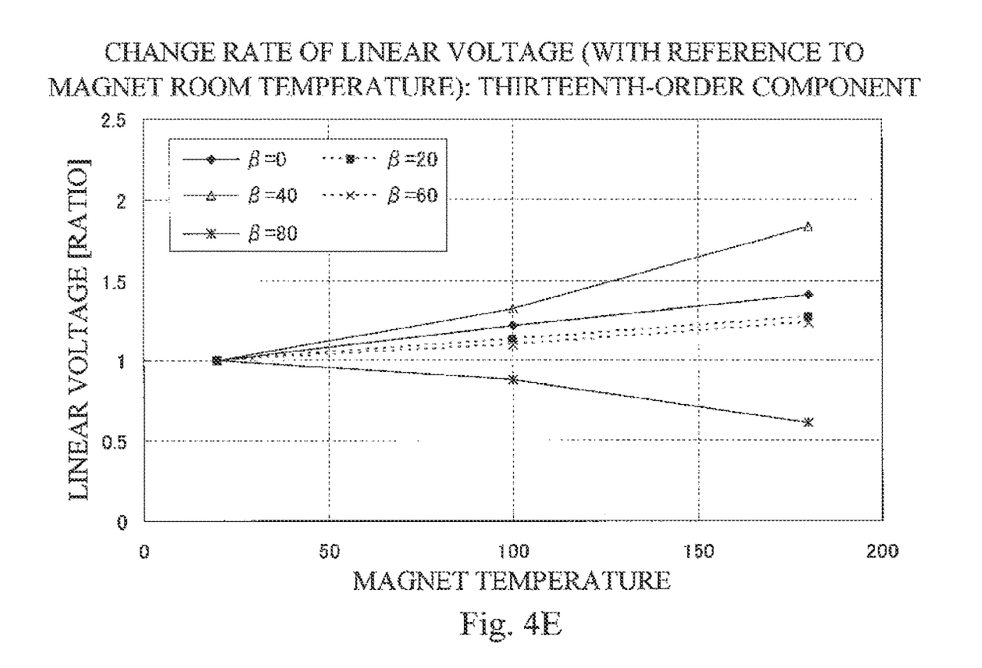
FIG. 4E is a graph for showing a change rate of a thirteenth-order component of the line voltage with respect to the magnet temperature in the electromagnetic field analysis according to the first embodiment of the present invention.

(1) It is understood that the change rates of the high-order components (fifth-order, seventh-order, eleventh-order, and thirteenth-order) of the line voltage shown in FIG. 4B to FIG. 4E for any of the current phases β are larger than the change rate of the fundamental component of the line voltage shown in FIG. 4A. Accordingly, it can be said that the high-order components are more suitable parameters than the fundamental component for magnet temperature estimation because the high-order components have a larger change with respect to the magnet temperature.

(2) In detection of the high-order component, a plurality of components, such as "fifth-order and seventh-order" or "seventh-order, eleventh-order, and thirteenth-order", can also be handled instead of a single component. Accordingly, the handling of the plurality of parameters increases a variation of the magnet temperature estimation method, and hence the magnet temperature can be estimated with higher accuracy based on a plurality of estimated values. Note that, details of the estimation method are described later in second and third embodiments of the present invention.

(3) In this analysis, data on each of the fifth-order, seventh-order, eleventh-order, and thirteenth-order components as high-order components was verified. However, because the frequencies of the eleventh-order component and the thirteenth-order component are approximately twelve times as large as that of the fundamental component, measurement for regions excluding an ultra-low speed region requires extremely fine sampling. In view of this point, the fifth-order component or the seventh-order component are relatively easy to measure and are practical, because the frequencies thereof belong to a relatively low class among the existing high-order components (no even-order components or no components of multiples of 3 exist in the line voltage).

(4) The superiority of the detection of a high-order component has been described above, but the fundamental component shown in FIG. 4A is low in frequency and has an advantage of being easily detected, although the change rate is small. Thus, when the estimation results with not only the high-order components but also the fundamental component are combined, the increase in variation of the magnet temperature estimation method and the easiness of detection can be realized.

(5) As the voltage to be detected, any one of the phase voltage and the line voltage can be used as described above. Note that, in the case of actually measuring the phase voltage, it is necessary to extract a neutral point. Thus, the line voltage has an advantage of being easily actually measured. However, in the case of estimating the voltage value based on a command value, the easiness of use is the same for the phase voltage and the line voltage.

As described above, according to the first embodiment, the high-order voltage component, which has a large change rate with respect to the magnet temperature, is used to estimate the magnet temperature. Specifically, as the parameters affecting the voltage from which the high-order component is detected, two or more parameters formed of the magnet temperature and another one or more parameters are employed. Further, the correspondence relationship between the two or more parameters and the high-order voltage component are stored in advance as a table based on actual measurement results or analysis results.

Then, the magnet temperature is estimated based on the result of detection of the parameter values other than the magnet temperature, the result of extraction of the high-order voltage component, and the data stored as the table in association with the high-order voltage component. As a result, the estimation with use of the high-order voltage component having a large change rate with respect to the magnet temperature is performed, and hence the magnet temperature estimation capable of estimating the magnet temperature with high accuracy without based only on the fundamental component can be realized.

Note that, in the description in the first embodiment, a description has been given of the case where the rotation speed, the d-axis current id, and the q-axis current iq are used as the parameters other than the magnet temperature, which affect the voltage from which the high-order component is detected. However, the invention of the subject application is not intended to be limited to the above-mentioned number of parameters other than the magnet temperature or the above-mentioned physical quantity employed as the parameter. The present invention focuses on a high-order voltage component, which has a large change rate with respect to the magnet temperature, and the technical feature of the present invention resides in that the result of detection of the high-order component is used to estimate the magnet temperature with high accuracy. Then, what is secondarily selected as another parameter affecting the detection of the high-order component is not limited to the one exemplified in the first embodiment.

Second Embodiment

In the second embodiment of the present invention, a description is given of a magnet temperature estimation device for a permanent magnet motor, which is capable of realizing improvement in magnet temperature estimation accuracy by handling a plurality of high-order components as high-order voltage components, such as "fifth-order and seventh-order" or "seventh-order, eleventh-order, and thirteenth-order", rather than handing only one high-order component.

Figure 5:
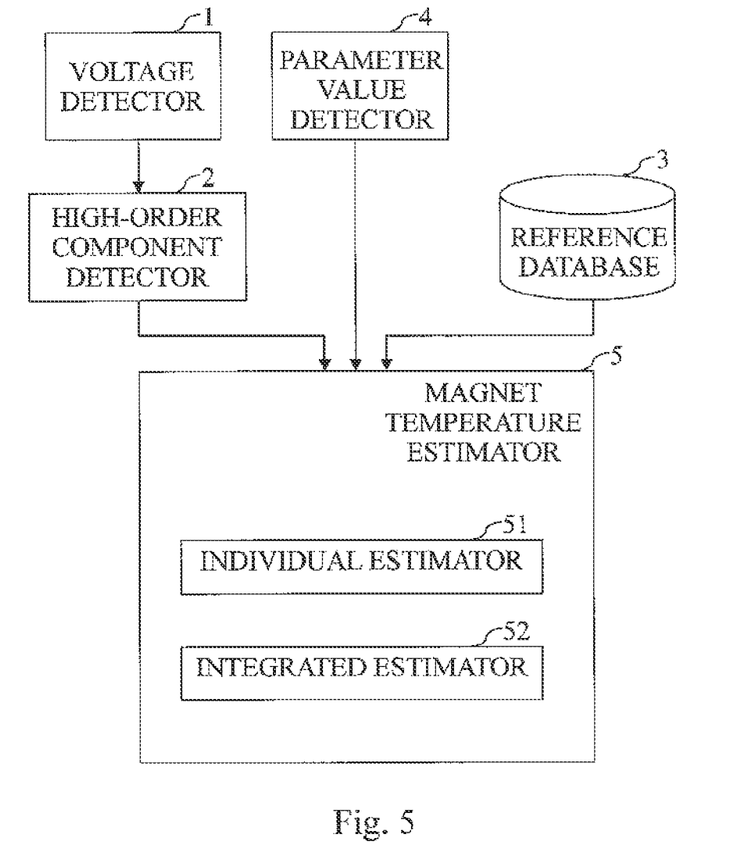
FIG. 5 is a block diagram of a magnet temperature estimation device according to a second embodiment of the present invention.

FIG. 5 is a block diagram of a magnet temperature estimation device according to the second embodiment of the present invention. As compared to the block diagram of FIG. 1 according to the above-mentioned first embodiment, the block diagram illustrated in FIG. 5 differs in that the magnet temperature estimator 5 includes an individual estimator 51 and an integrated estimator 52 as an internal configuration thereof. Then, the individual estimator 51 and the integrated estimator 52 as new components are mainly described below.

The individual estimator 51 included in the magnet temperature estimator 5 calculates individual magnet temperature estimated values for the plurality of high-order voltage components by the estimation method described in the above-mentioned first embodiment. In the following description, the case where the individual estimator 51 individually estimates magnet temperature estimated values for three components of the fifth-order component, the seventh-order component, and the eleventh-order component is described as an example.

Next, the integrated estimator 52 included in the magnet temperature estimator 5 performs integral processing on the respective magnet temperature estimated values for the three components estimated by the individual estimator 51, thereby specifying one magnet temperature estimated value. For example, the integrated estimator 52 determines an average value of the three components or employs an intermediate value thereof, thereby being capable of specifying one magnet temperature estimated value.

As described above, according to the second embodiment, one magnet temperature estimated value is specified based on the magnet temperatures estimated individually for the plurality of high-order components. Consequently, measurement fluctuations among the components can be suppressed to realize further improvement in estimation accuracy.

Third Embodiment

In the third embodiment of the present invention, a description is given of a case where a plurality of components are handled and a measure different from that in the above-mentioned second embodiment is used to improve the magnet temperature estimation accuracy. Note that, the block diagram of a magnet temperature estimation device according to the third embodiment is the same as the block diagram illustrated in FIG. 5 according to the above-mentioned second embodiment.

As the parameters affecting the voltage from which the high-order component is detected, there are various kinds of parameters other than the magnet temperature, such as the rotation speed, the coil temperature, the current, and the current phase, as described in the above-mentioned first embodiment. Accordingly, the number of magnet temperatures to be estimated by the magnet temperature estimator 5 is not always one for a certain high-order component, and a plurality of magnet temperatures may be estimated.

Specifically, a case is assumed in which the individual estimator 51 determines two estimated values of 90° C. and 120° C. for the fifth-order component and an estimated value of 90° C. for the seventh-order component. In this case, the logic "when one component estimates two or more magnet temperatures, the temperature in common to other components (or included in a predetermined range) is regarded as true" is embedded, and the integrated estimator 52 can narrow down the estimated values into 90° C.

As described above, according to the third embodiment, even when two or more magnet temperatures are estimated for one high-order component, the two or more magnet temperatures are compared to the magnet temperature estimated for another high-order component, to thereby specify one magnet temperature estimated value. Consequently, an error in the magnet temperature estimation can be reduced to realize further improvement in estimation accuracy.

The invention claimed is:

1. A magnet temperature estimation device for a permanent magnet motor,
   the permanent magnet motor comprising an annular stator having a winding wound therearound and a rotator core including a permanent magnet,
   the magnet temperature estimation device comprising:
   a voltage detector for detecting a voltage at a time when the winding is energized;
   a high-order component detector for detecting a high-order component of the voltage detected by the voltage detector;
   a reference database for storing in advance, as a table, a correspondence relationship between the high-order component and two or more parameters, which include a magnet temperature and another one or more parameters, as parameters affecting the voltage from which the high-order component is detected;
   a parameter value detector for detecting a value of the another one or more parameters; and
   a magnet temperature estimator for estimating a magnet temperature corresponding to the high-order component detected by the high-order component detector based on the another one or more parameters detected by the parameter value detector and the table stored in the reference database.

2. The magnet temperature estimation device for a permanent magnet motor according to claim 1,
   wherein the high-order component detector detects a plurality of high-order components of the voltage detected by the voltage detector,
   wherein the reference database stores individual tables corresponding to the respective plurality of high-order components, and
   wherein the magnet temperature estimator estimates a plurality of magnet temperatures corresponding to the respective plurality of high-order components based on the another one or more parameters detected by the parameter value detector and the individual tables stored in the reference database, and specifies one magnet temperature estimated value based on the estimated plurality of magnet temperatures.

3. The magnet temperature estimation device for a permanent magnet motor according to claim 1, wherein the high-order component detected by the high-order component detector comprises a fifth-order component or a seventh-order component.

4. The magnet temperature estimation device for a permanent magnet motor according to claim 1,
wherein the high-order component detector further detects a fundamental component of the voltage detected by the voltage detector,
wherein the reference database further stores a fundamental component table corresponding to the fundamental component, and
wherein, when estimating the magnet temperature corresponding to the high-order component detected by the high-order component detector, the magnet temperature estimator refers also to a magnet temperature estimated correspondingly to the fundamental component detected by the high-order component detector.

5. The magnet temperature estimation device for a permanent magnet motor according to claim 1, wherein the voltage detector detects a line voltage as the voltage that is detected when the winding is energized.

6. The magnet temperature estimation device for a permanent magnet motor according to claim 2, wherein the magnet temperature estimator determines an average value of a plurality of magnet temperatures estimated correspondingly to the respective plurality of high-order components, to thereby specify the one magnet temperature estimated value.

7. The magnet temperature estimation device for a permanent magnet motor according to claim 2, wherein, when two or more magnet temperatures are estimated for a certain component among the plurality of high-order components, the magnet temperature estimator eliminates an estimated value among the two or more magnet temperatures, which deviates from the magnet temperature estimated for other high-order components by a predetermined amount or more, as an erroneous estimation.

8. The magnet temperature estimation method for a permanent magnet motor,
the permanent magnet motor comprising an annular stator having a winding wound therearound and a rotator core including a permanent magnet,
the magnet temperature estimation method comprising:
a voltage detection step of detecting a voltage at a time when the winding is energized;
a high-order component detection step of detecting a high-order component of the voltage detected in the voltage detection step;
a storing step of storing in a storage unit in advance, as a table, a correspondence relationship between the high-order component and two or more parameters, which include a magnet temperature and another one or more parameters, as parameters affecting the voltage from which the high-order component is detected;
a parameter value detection step of detecting a value of the another one or more parameters; and
a magnet temperature estimation step of estimating a magnet temperature corresponding to the high-order component detected in the high-order component detection step based on the another one or more parameters detected in the parameter value detection step and the table stored in the storage unit in the storing step.

* * * * *